United States Patent
Drissi et al.

(10) Patent No.: US 6,728,689 B1
(45) Date of Patent: Apr. 27, 2004

(54) METHOD AND APPARATUS FOR GENERATING A DATA CLASSIFICATION MODEL USING INTERACTIVE ADAPTIVE LEARNING ALGORITHMS

(75) Inventors: Youssef Drissi, Ossining, NY (US); Ricardo Vilalta, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 09/713,341

(22) Filed: Nov. 14, 2000

(51) Int. Cl.$^7$ .............................. G06E 1/00; G06F 15/18
(52) U.S. Cl. .............................. 706/14; 706/12; 706/20; 706/46; 706/47
(58) Field of Search ................................ 706/45–47, 12, 706/14

(56) References Cited

U.S. PATENT DOCUMENTS

| | | | | |
|---|---|---|---|---|
| 5,701,400 A | * | 12/1997 | Amado | 706/45 |
| 5,787,234 A | * | 7/1998 | Molloy | 706/46 |
| 5,870,731 A | * | 2/1999 | Trif et al. | 706/52 |
| 6,169,981 B1 | * | 1/2001 | Werbos | 706/23 |
| 6,249,781 B1 | * | 6/2001 | Sutton | 706/25 |
| 6,581,048 B1 | * | 6/2003 | Werbos | 706/23 |

OTHER PUBLICATIONS

Breiman, "Bagging Predictors," Machine Learning, 23 123–140 (1996).*
Gama et al., "Characterization of Classification Algorithms," In C Pinto–Ferreira and N. Mameda (eds.) Progress in Artificial Intelligence, 189–200 (1995).*
Perez et al., "Learning Despite Concept Variation by Finding Structure in Attribute–Based Data," International mConference on Machine Learning (1996).*
Thrun et al., "Learning One More Thing," Proc. of ISCA Montreal (1995).*

(List continued on next page.)

*Primary Examiner*—Anil Khatri
*Assistant Examiner*—Michael B. Holmes
(74) *Attorney, Agent, or Firm*—Ryan, Mason & Lewis, LLP; Louis J. Percello

(57) ABSTRACT

A data classification method and apparatus are disclosed for labeling unknown objects. The disclosed data classification system employs a learning algorithm that adapts through experience. The present invention classifies objects in domain datasets using data classification models having a corresponding bias and evaluates the performance of the data classification. The performance values for each domain dataset and corresponding model bias are processed to identify or modify one or more rules of experience. The rules of experience are subsequently used to generate a model for data classification. Each rule of experience specifies one or more characteristics for a domain dataset and a corresponding bias that should be utilized for a data classification model if the rule is satisfied. The present invention dynamically modifies the assumptions (bias) of the learning algorithm to improve the assumptions embodied in the generated models and thereby improve the quality of the data classification and regression systems that employ such models. A dynamic bias may be employed in the meta-learning algorithm by utilizing two self-adaptive learning algorithms. In a first function, each self-adaptive learning algorithm generates models used for data classification. In a second function, each self-adaptive learning algorithm serves as an adaptive meta-learner for the other adaptive learning algorithm.

24 Claims, 9 Drawing Sheets

OTHER PUBLICATIONS

Towards knowledge management in autonomic systems Cofino, T.; Doganata, Y.; Drissi, Y.; Tong Fin; Kozakov, L.; Laker, M.; Computers and Communication, 2003. (ISCC 2003). Proceedings. Eighth IEEE International Symposium on , 2003 Page(s): 789–794.*

PENS: a Predictive Event Notification System for e–commerce environment Jun–Jang Jeng; Drissi, Y.; Computer Software and Applications Conference, 2000. COMPSAC 2000. The 24th Annual International , Oct. 25–27, 2000 Page(s): 93–98.*

Predicting rare events in temporal domains Vilalta, R.; Sheng Ma; Data Mining, 2002. ICDM 2002. Proceedings. 2002 IEEE International Conference on , Dec. 9–12, 2002 Page(s): 474–481.*

Breiman., "Bagging Predictors," Machine Learning, 23, 123–140 (1996).

Perez et al., "Learning Depsite Concept Variation by Finding Structure in Attribute–Based Data," International Conference on Machine Learning (1996).

* cited by examiner

500

| RULE IDENTIFIER (550) | RULE CONDITION (560) | BIAS (570) |
|---|---|---|
| RULE 1 (505) | IF DENSITY < 0.7 & VARIATION > 0.8 | NON-LINEAR DISCRIMINANT |
| RULE 2 (510) | IF ENTROPY < 0.7 & VARIATION < 0.4 | LINEAR DISCRIMINANT |
| ⋮ | | |
| RULE N (515) | ⋮ | |

600

META-LEVEL PERFORMANCE DATASET 1200

| META-FEATURES PERFORMANCE DATASET 1250 | RULES OF EXPERIENCE 1255 | QUALITY 1260 |
|---|---|---|
| META-FEATURES PERFORMANCE DATASET 1 (1205) | RULES OF EXPERIENCE 1 | QUALITY 1 |
| META-FEATURES PERFORMANCE DATASET 2 (1210) | RULES OF EXPERIENCE 2 | QUALITY 2 |
| META-FEATURES PERFORMANCE DATASET 3 (1215) | RULES OF EXPERIENCE 3 | QUALITY 3 |

METHOD AND APPARATUS FOR GENERATING A DATA CLASSIFICATION MODEL USING INTERACTIVE ADAPTIVE LEARNING ALGORITHMS

CROSS REFERENCE TO RELATED APPLICATION

The present invention is related to U.S. patent Application Ser. No. 09/713,342 entitled "Methods and Apparatus for Generating a Data Classification Model Using an Adaptive Learning Algorithm," filed contemporaneously herewith, assigned to the assignee of the present invention and incorporated by reference herein.

FIELD OF THE INVENTION

The present invention relates generally to the fields of data mining or machine learning and, more particularly, to methods and apparatus for generating data classification models.

BACKGROUND OF THE INVENTION

Data classification techniques, often referred to as supervised learning, attempt to find an approximation or hypothesis to a target concept that assigns objects (such as processes or events) into different categories or classes. Data classification can normally be divided into two phases, namely, a learning phase and a testing phase. The learning phase applies a learning algorithm to training data. The training data is typically comprised of descriptions of objects (a set of feature variables) together with the correct classification for each object (the class variable).

The goal of the learning phase is to find correlations between object descriptions to learn how to classify the objects. The training data is used to construct models in which the class variable may be predicted in a record in which the feature variables are known but the class variable is unknown. Thus, the end result of the learning phase is a model or hypothesis (e.g., a set of rules) that can be used to predict the class of new objects. The testing phase uses the model derived in the training phase to predict the class of testing objects. The classifications made by the model is compared to the true object classes to estimate the accuracy of the model.

Numerous techniques are known for deriving the relationship between the feature variables and the class variables, including, for example, Disjunctive Normal Form (DNF) Rules, decision trees, nearest neighbor, support vector machines (SVMs) and Bayesian classifiers, as described, for example, in R. Agrawal et al., "An Interval Classifier for Database Mining Applications," Proc. of the 18th VLDB Conference, Vancouver, British Columbia, Canada 1992; C. Apte et al., "RAMP: Rules Abstraction for Modeling and Prediction," IBM Research Report RC 20271, June 1995; J. R. Quinlan, "Induction of Decision Trees," Machine Learning, Volume 1, Number 1, 1986; J. Shafer et al., "SPRINT: A Scaleable Parallel Classifier for Data Mining," Proc. of the 22d VLDB Conference, Bombay, India, 1996; M. Mehta et al., "SLIQ: A Fast Scaleable Classifier for Data Mining," Proceedings of the Fifth International Conference on Extending Database Technology, Avignon, France, March, 1996, each incorporated by reference herein.

Data classifiers have a number of applications that automate the labeling of unknown objects. For example, astronomers are interested in automated ways to classify objects within the millions of existing images mapping the universe (e.g., differentiate stars from galaxies). Learning algorithms have been trained to recognize these objects in the training phase, and used to predict new objects in astronomical images. This automated classification process obviates manual labeling of thousands of currently available astronomical images.

While such learning algorithms derive the relationship between the feature variables and the class variables, they generally produce the same output model given the same domain dataset. Generally, a learning algorithm encodes certain assumptions about the nature of the concept to learn, referred to as the bias of the learning algorithm. If the assumptions are wrong, however, then the learning algorithm will not provide a good approximation of the target concept and the output model will exhibit low accuracy. Most research in the area of data classification has focused on producing increasingly more accurate models, which is impossible to attain on a universal basis over all possible domains. It is now well understood that increasing the quality of the output model on a certain group of domains will cause a decrease of quality on other groups of domains. See, for example, C. Schaffer, "A Conservation Law for Generalization Performance," Proc. of the Eleventh Int'l Conference on Machine Learning, 259–65, San Francisco, Morgan Kaufmnan (1994); and D. Wolpert, "The Lack of a Priori Distinctions Between Learning Algorithms and the Existence of a Priori Distinctions Between Learning Algorithms," Neural Computation, 8 (1996), each incorporated by reference herein.

While conventional learning algorithms produce sufficiently accurate models for many applications, they suffer from a number of limitations, which, if overcome, could greatly improve the performance of the data classification and regression systems that employ such models. Specifically, the learning algorithms of conventional data classification and regression systems are unable to adapt over time. In other words, once a model is generated by a learning algorithm, the model cannot be reconfigured based on experience. Thus, the conventional data classification and regression systems that employ such models are prone to repeating the same errors.

Our contemporaneously filed patent application discloses a data classification system that adapt a learning algorithm through experience. The disclosed data classification system employs a meta-learning algorithm to dynamically modify the assumptions of the learning algorithm embodied in the generated models. The meta-learning algorithm utilized by the data classification system, however, has a fixed bias. Since modifying the assumptions of the learning algorithm inevitably requires further assumptions at the meta-level, it appears that an infinite chain of modifications is necessary to produce adaptive learning algorithms. A need therefore exists for a method and apparatus for adapting both the learning algorithm and the meta-learning algorithm through experience.

SUMMARY OF THE INVENTION

Generally, a data classification method and apparatus are disclosed for labeling unknown objects. The disclosed data classification system employs a learning algorithm that adapts through experience. The present invention classifies objects in domain datasets using data classification models having a corresponding bias and evaluates the performance of the data classification. The performance values for each domain dataset and corresponding model bias are processed to initially identify (and over time modify) one or more rules of experience. The rules of experience are then subsequently used to generate a model for data classification. Each rule of experience specifies one or more characteristics for a domain dataset and a corresponding bias that should be utilized for a data classification model if the rule is satisfied.

Thus, the present invention dynamically modifies the assumptions (bias) of the learning algorithm to improve the assumptions embodied in the generated models and thereby improve the quality of the data classification and regression systems that employ such models. Furthermore, since the rules of experience change dynamically, the learning process of the present invention will not necessarily output the same model when the same domain dataset is presented again. Furthermore, the disclosed self-adaptive learning process will become increasingly more accurate as the rules of experience are accumulated over time.

According to another aspect of the invention, a fixed or dynamic bias can be employed in the meta-learning algorithm. Generally, a dynamic bias may be employed in the meta-learning algorithm, without introducing an infinite chain, by utilizing two self-adaptive learning algorithms, where each of the two self-adaptive learning algorithms has two functions. In a first function, each self-adaptive learning algorithm generates models used for data classification. In a second function, each self-adaptive learning algorithm serves as an adaptive meta-learner for the other adaptive learning algorithm.

A more complete understanding of the present invention, as well as further features and advantages of the present invention, will be obtained by reference to the following detailed description and drawings.

DETAILED DESCRIPTION OF PREFERRED EMBODIMENTS

Figure 1:
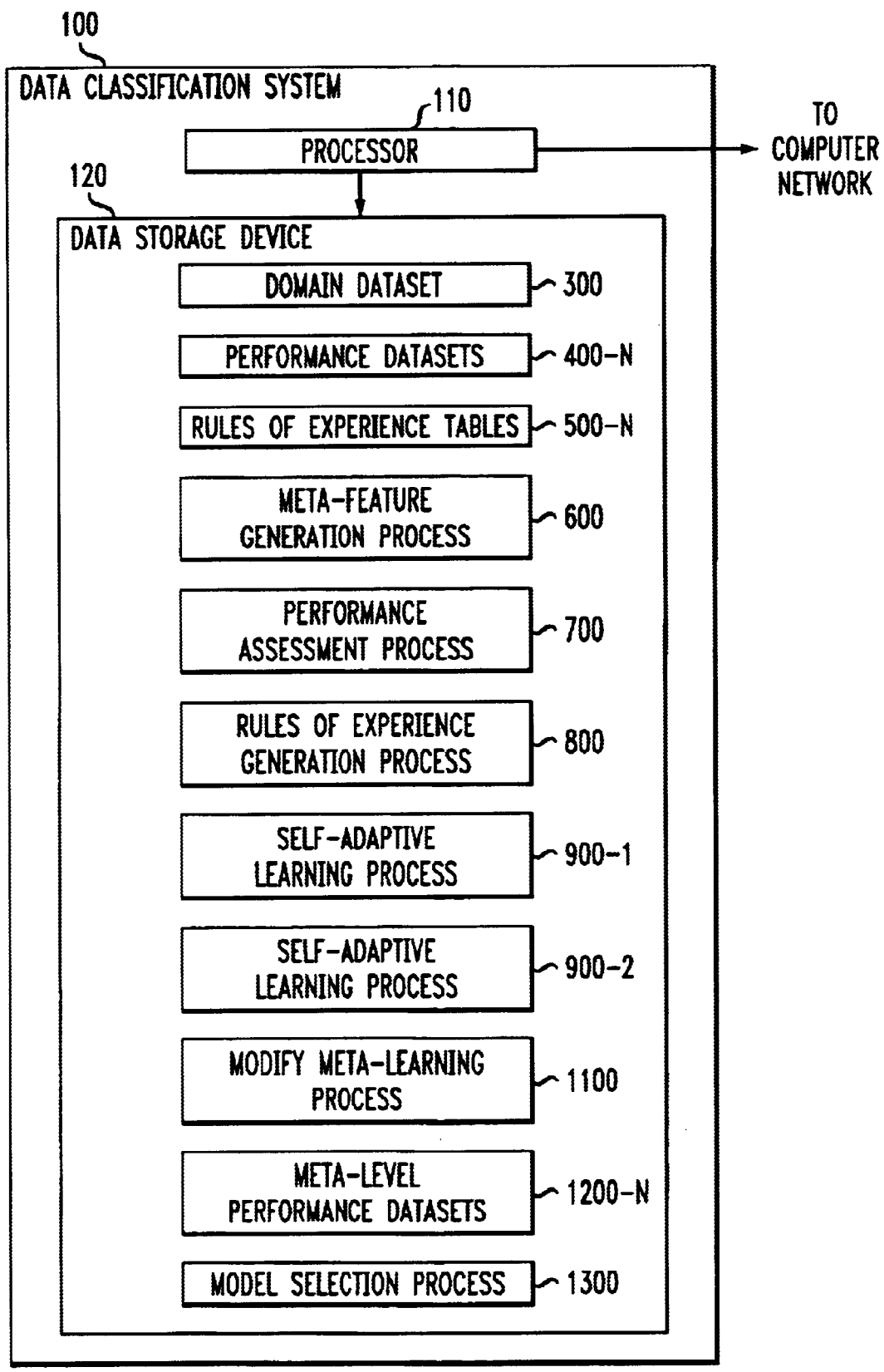
FIG. 1 a schematic block diagram showing the architecture of an illustrative data classification system in accordance with the present invention.

FIG. 1 illustrates a data classification system 100 in accordance with the present invention. The data classification system 100 may be embodied as a conventional data classification system, such as the learning program described in J. R. Quinlan, C4.5: Programs for Machine Learning. Morgan Kaufmann Publishers, Inc. Palo Alto, Calif., incorporated by reference herein, as modified in accordance with the features and functions of the present invention to provide an adaptive learning algorithm.

The following discussion is organized as follows. Initially, an adaptive data classification system is discussed in conjunction with FIGS. 1 through 9, that employs a meta-learning algorithm to dynamically modify the assumptions of the learning algorithm embodied in the generated models. The meta-learning algorithm discussed in conjunction with FIGS. 1 through 9 may itself utilize either a fixed or dynamic bias. Thereafter, a novel technique is discussed in conjunction with FIGS. 10 through 13 for employing a dynamic bias in the meta-learning algorithm. Generally, a dynamic bias may be employed in the meta-learning algorithm, without introducing an infinite chain, by utilizing two self-adaptive learning algorithms 900-1 and 900-2, as shown in FIG. 1. As discussed further below, each of the two self-adaptive learning algorithms 900-1 and 900-2 has two functions: (i) generating models used for data classification (as discussed in conjunction with FIG. 9); and (ii) serving as an adaptive meta-learner for the other adaptive learning algorithm (as discussed in conjunction with FIG. 11). For each self-adaptive learning algorithm 900-1 and 900-2, there will be a corresponding performance dataset 400-N and rules of experience table 500.

FIG. 1 is a schematic block diagram showing the architecture of an illustrative data classification system 100 in accordance with the present invention. The data classification system 100 may be embodied as a general purpose computing system, such as the general purpose computing system shown in FIG. 1. The data classification system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute. As shown in FIG. 1, the data classification system 100 optionally includes a connection to a computer network (not shown).

As shown in FIG. 1 and discussed further below in conjunction with FIGS. 3 through 5, the data storage device 120 preferably includes a domain dataset 300, a performance dataset 400 and a rules of experience table 500. Generally, the domain dataset 300 contains a record for each object and indicates the class associated with each object. The performance dataset 400 indicates the learning algorithm that produced the best model for each domain. The rules of experience table 500 identify a number of prioritized rules and their corresponding conditions, which if satisfied, provide a bias or assumption that should be employed when generating a model.

In addition, as discussed further below in conjunction with FIGS. 6 through 13, the data storage device 120 includes a meta-feature generation process 600, a performance assessment process 700, a rules of experience generation process 800, a self-adaptive learning process 900, a modify meta-learning process 1100, a meta-level performance dataset 1200-N for each learning process 900, and a model selection process 1300.

Generally, the meta-feature generation process 600 processes each domain dataset to represent the domain as a set of meta-features. The performance assessment process 700 evaluates the performance of a given model for a given domain dataset described by a set of meta-features and stores the results in the performance dataset 400. The rules of experience generation process 800 evaluates the performance dataset 400 in order to modify or extend the current rules in the rules of experience table 500. The self-adaptive learning process 900 identifies the best model for a given domain dataset 300, based on the current rules of experience table 500. The modify meta-learning process 1100, meta-level performance dataset 1200-N, and model selection process 1300 are used to employ a dynamic bias in the meta-learning algorithm.

Figure 2:
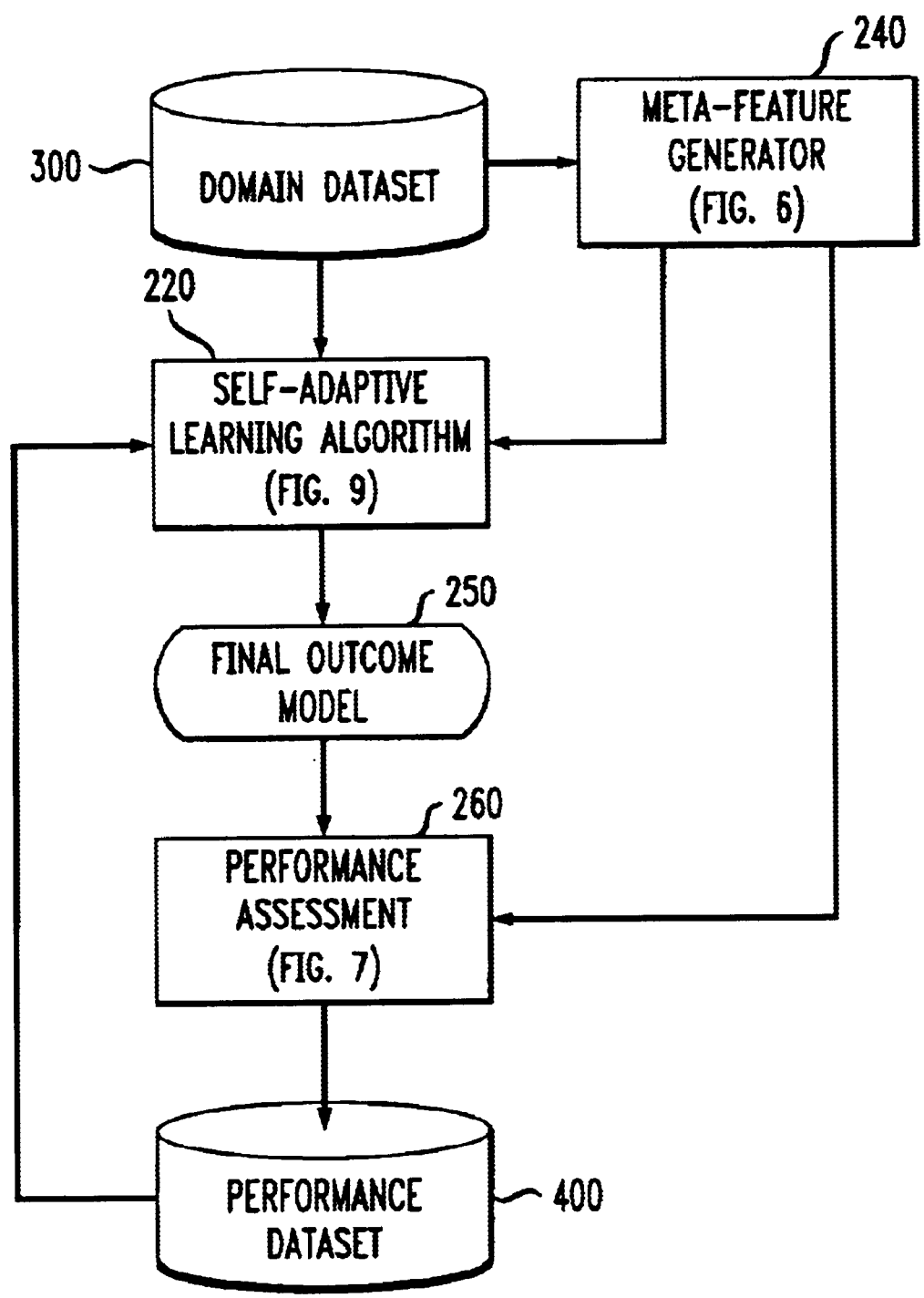
FIG. 2 illustrates the operation of the data classification system.

FIG. 2 provides a global view of the data classification system 100. As shown in FIG. 2, a domain dataset 300, discussed below in conjunction with FIG. 3, serves as input to the system 100. The domain dataset 300 is applied to a self-adaptive learning process 900, discussed below in conjunction with FIG. 9, during step 220 and a meta-feature generation process 600, discussed below in conjunction with FIG. 6, during step 240. Generally, the self-adaptive learning process 900 produces an output model 250 that can be used to predict the class labels of future examples. For a detailed discussion of suitable models 250, see, for example, J. R. Quinlan, C4.5: Programs for Machine Learning. Morgan Kaufmann Publishers, Inc. Palo Alto, Calif. (1994) (decision trees); Weiss, Sholom and Indurkhya, Nitin, "Optimized Rule Induction", Intelligent Expert, Volume 8, Number 6, pp. 61–69, 1993 (rules); and L. R. Rivest, "Learning Decision Lists", Machine Learning, 2, 3, 229–246, (1987) (decision lists), each incorporated by reference herein.

The meta-feature generation process 600 executed during step 240 represents the domain dataset 300 as a set of meta-features. The performance of the output model 250 is assessed during step 260 by the performance assessment process 700, discussed below in conjunction with FIG. 7, and the performance assessment is recorded in the performance dataset 400. The performance assessment process 700 executed during step 260 evaluates how much the output model 250 can be improved.

As shown in FIG. 2, the self-adaptive learning process 900 receives the following information as inputs: (i) the domain dataset 300; (ii) the meta-feature description of the domain dataset 300; and (iii) the performance dataset 400. As discussed further below in conjunction with FIG. 9, the self-adaptive learning process 900 can use these inputs to modify the underlying assumptions embodied in a given model, such that, if the same dataset 300 were to be presented again to the self-adaptive learning process 900 a more accurate model would be produced.

Databases

Figures 3, 4:
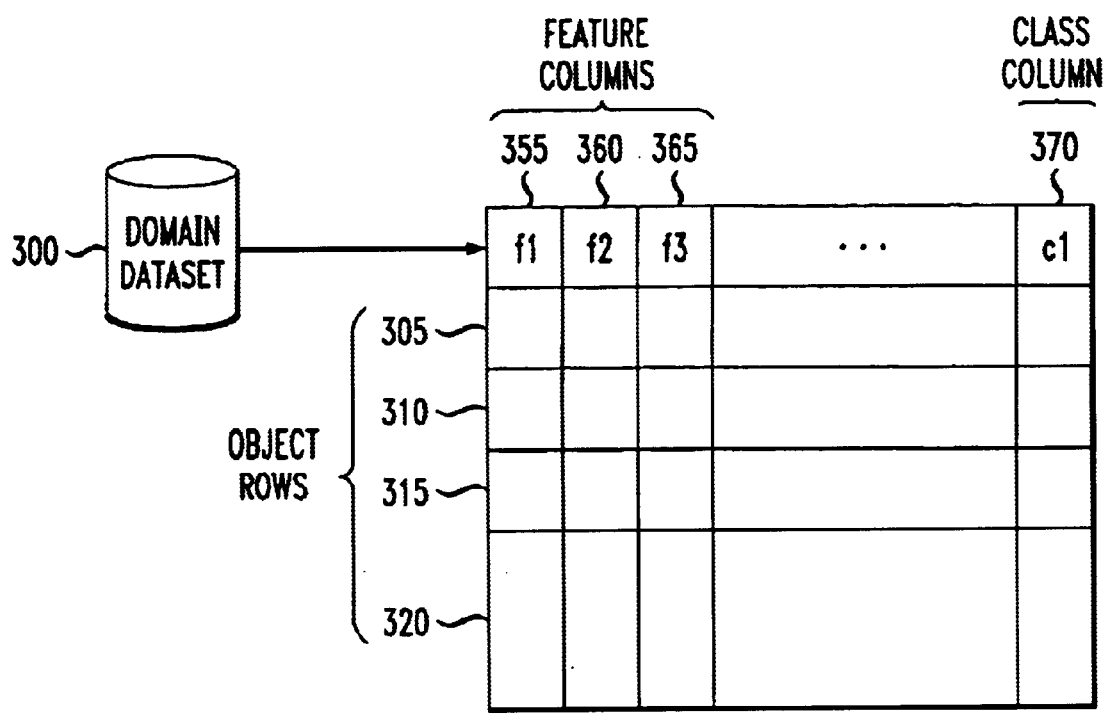
FIG. 3 illustrates an exemplary table from the domain dataset of FIG. 1.
FIG. 4 illustrates an exemplary table from the performance dataset of FIG. 1.

FIG. 3 illustrates an exemplary table from the domain dataset 300 that includes training examples, each labeled with a specific class. As previously indicated, the domain dataset 300 contains a record for each object and indicates the class associated with each object. The domain dataset 300 maintains a plurality of records, such as records 305 through 320, each associated with a different object. For each object, the domain dataset 300 indicates a number of features in fields 350 through 365, describing each object in the dataset. The last field 370 corresponds to the class assigned to each object. For example, if the domain dataset 300 were to correspond to astronomical images to be classified as either stars or galaxies, then each record 305–320 would correspond to a different object in the image, and each field 350–365 would correspond to a different feature such as the amount of luminosity, shape or size. The class field 370 would be populated with the label of "star" or "galaxy."

FIG. 4 illustrates an exemplary table from the performance dataset 400. As previously indicated, the performance dataset 400 indicates the performance for each model on a domain. The performance dataset 400 maintains a plurality of records, such as records 405 through 415, each associated with a different model. For each model, the performance dataset 400 identifies the domain on which the model was utilized in field 450, as well as the underlying bias embodied in the model in field 455 and the performance assessment in field 460. Each domain can be identified in field 450, for example, using a vector of meta-features characterizing each domain (as produced by the meta-feature generation process 600). As previously indicated, for each self-adaptive learning algorithm 900-1 and 900-2, there will be a corresponding performance dataset 400-N.

Figures 5, 6:
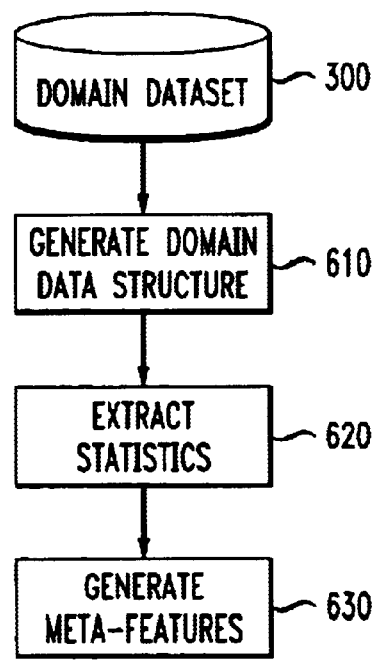
FIG. 5 illustrates an exemplary table from the rules of experience table of FIG. 1.
FIG. 6 is a flow chart describing the meta-feature generation process of FIG. 1.

FIG. 5 illustrates an exemplary table from the rules of experience table 500. The rules of experience table 500 identifies a number of prioritized rules and their corresponding conditions, which if satisfied, provide a bias or assumption that should be employed when generating a model. As shown in FIG. 5, the rules of experience table 500 includes a plurality of records, such as records 505 through 515, each associated with a different experience rule. For each rule identified in field 550, the rules of experience table 500 identifies the corresponding conditions associated with the rule in field 560 and the bias or assumption that should be employed in a model when the rule is satisfied in field 570.

It is noted that the exemplary rules of experience table 500 shown in FIG. 5 also illustrates exemplary rules suitable for the meta-rules of experience table 1150, discussed further below in conjunction with FIG. 11. As previously indicated, a dynamic bias is employed in the meta-learning algorithm using two adaptive learning algorithms. Each of the two adaptive learning algorithms has two functions: (i) generating models used for data classification (as discussed in conjunction with FIG. 9); and (ii) serving as an adaptive meta-learner for the other adaptive learning algorithm (as discussed in conjunction with FIG. 11). The models generated for data classification pursuant to the first function are recorded in the rules of experience table 500. The models relating to performance of the other adaptive learning algorithm pursuant to the second function are recorded in the meta-rules of experience table 1150.

Generally, while the rules of experience table 500 identify a particular bias to employ for data classification when a given domain dataset exhibits certain specified meta-features, the meta-rules of experience table 1150 identify a particular bias to employ in the meta-learner when a given performance dataset 400 exhibits certain specified meta-features. It is further noted that the generation of the rules of experience table 500 is discussed below in conjunction with FIG. 8, while the generation of the meta-rules of experience table 1150 is discussed below in conjunction with FIG. 11. As previously indicated, for each self-adaptive learning algorithm 900-1 and 900-2, there will be a corresponding rules of experience table 500 and meta-rules of experience table 1150.

Processes

FIG. 6 is a flow chart describing the meta-feature generation process 600. As previously indicated, the meta-feature generation process 600 processes each set of domain data to represent the domain as a set of meta-features. As shown in FIG. 6, the meta-feature generation process 600 initially processes the domain dataset 300 during step 610 to store the information in a table. Thereafter, the meta-feature generation process 600 extracts statistics from the dataset 300 during step 620 that are then used to generate meta-features during step 630. For a discussion of the generation of meta-features that are particularly relevant to the meta-learning phase, including concept variation or average weighted distance meta-features, as well as additional well-known meta-features, see, for example, U.S. patent application Ser. No. 09/629,086, filed Jul. 31, 2000, entitled "Methods and Apparatus for Selecting a Data Classification Model Using Meta-Learning," assigned to the assignee of the present invention and incorporated by reference herein.

Figure 7:
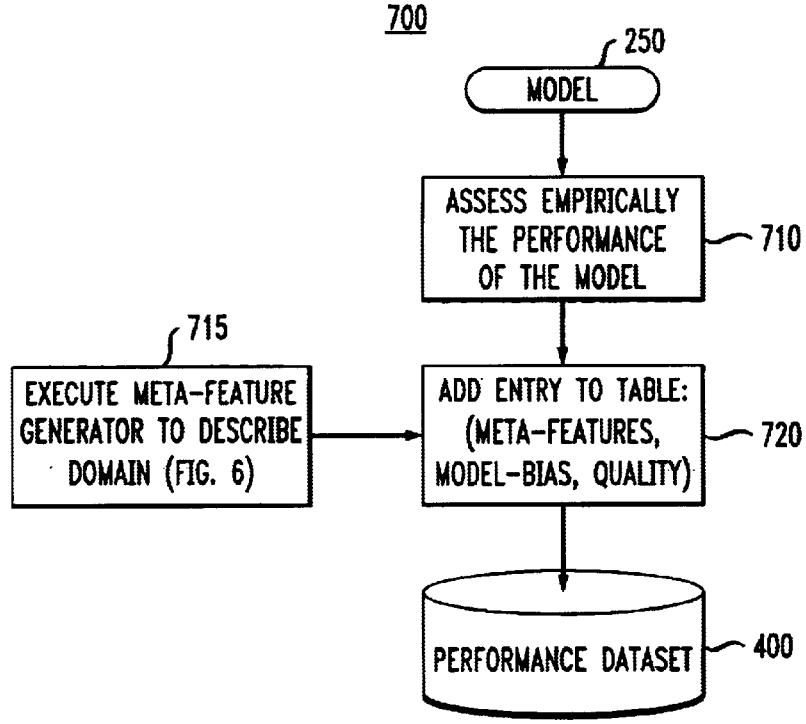
FIG. 7 is a flow chart describing the performance assessment process of FIG. 1.

FIG. 7 is a flow chart describing the performance assessment process 700. The performance assessment process 700 evaluates the performance of a given model for a given domain dataset and stores the results in the performance dataset 400. The process 700 initially receives a model 250 during step 710 and assesses empirically the performance of the model 250. In other words, the model 250 is used to classify objects during step 710, for which the classification is already known, so that an objective measure of the model performance may be obtained. Typically, the performance assessment corresponds to the estimated accuracy of the model 250.

As shown in FIG. 7, the domain is then processed during step 715 by the meta-feature generation process 600, discussed above in conjunction with FIG. 6, to obtain a vector of meta-features characterizing the domain. Thereafter, a new entry is created in the performance dataset 400 during step 720 using (i) the meta-feature description of the domain on which the model 250 was utilized, (ii) the underlying bias embodied in the model and (iii) the performance assessment determined during step 710.

Figure 8:
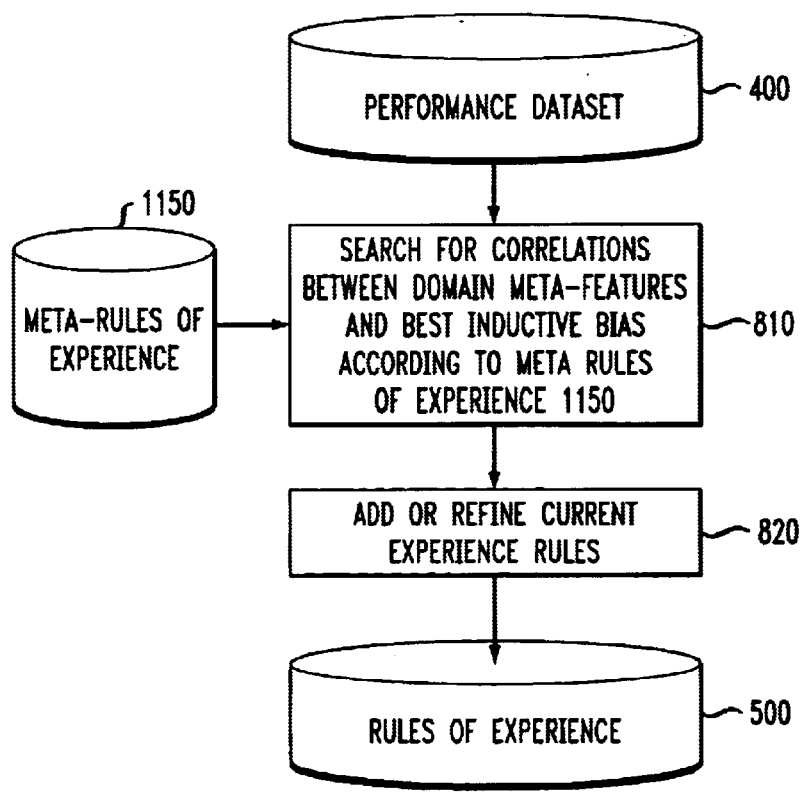
FIG. 8 is a flow chart describing the rules of experience generation process of FIG. 1.

FIG. 8 is a flow chart describing an exemplary rules of experience generation process 800 that evaluates the performance dataset 400 and the meta-rules of experience table 1150 in order to modify or extend the current rules in the rules of experience table 500. Thus, the performance dataset 400 acts as a normal domain, and the meta-rules of experience table 1150 relates to the performance of one of the self-adaptive learning algorithms 900. As shown in FIG. 8, the rules of experience generation process 800 initially evaluates the performance dataset 400 and the meta-rules of experience table 1150 during step 810 to identify correlations between various domains (described by a set of meta-features) and their corresponding best inductive bias (model), according to the meta-rules of experience table 1150. Since the meta-rules of experience table 1150 change over time, based on performance, the correlations are dynamically identified during step 810.

Generally, the rules of experience generation process 800 employs a simple learning algorithm that receives one or more domains as input (in this case, the performance dataset 400 and the meta-rules of experience table 1150) and produces as a result a model (in this case, the rule of experience 500). The difference lies in the nature of the domain(s). For a simple learning algorithm, the domain is a set of objects that belong to a real-world application, and where we wish to be able to predict the class of new objects. In the rules of experience generation process 800, each object contains the meta-features of a domain and the class of each object indicates the bias used to learn that domain. The rules of experience generation process 800 is thus a meta-learner that learns about the learning process itself. The mechanism behind it, however, is no different from a simple learning algorithm.

Based on the correlations identified during step 810, the current rules of experience are modified or extended during step 820 and recorded in the rules of experience table 500. For example, as shown in the exemplary rules of experience table 500 of FIG. 5, when models used a particular bias that partitioned the data in a specified manner, certain correlations were identified in various meta-features.

The modification or extension of the rules in the rules of experience table 500 will influence the future selection of models by the self-adaptive learning process 900, discussed below in conjunction with FIG. 9. Since the rules of experience change dynamically, the learning process 900 of the present invention will not necessarily output the same model when the same domain dataset is presented again. Furthermore, the self-adaptive learning process 900 will become increasingly more accurate as the rules of experience table 500 grows larger.

Figure 9:
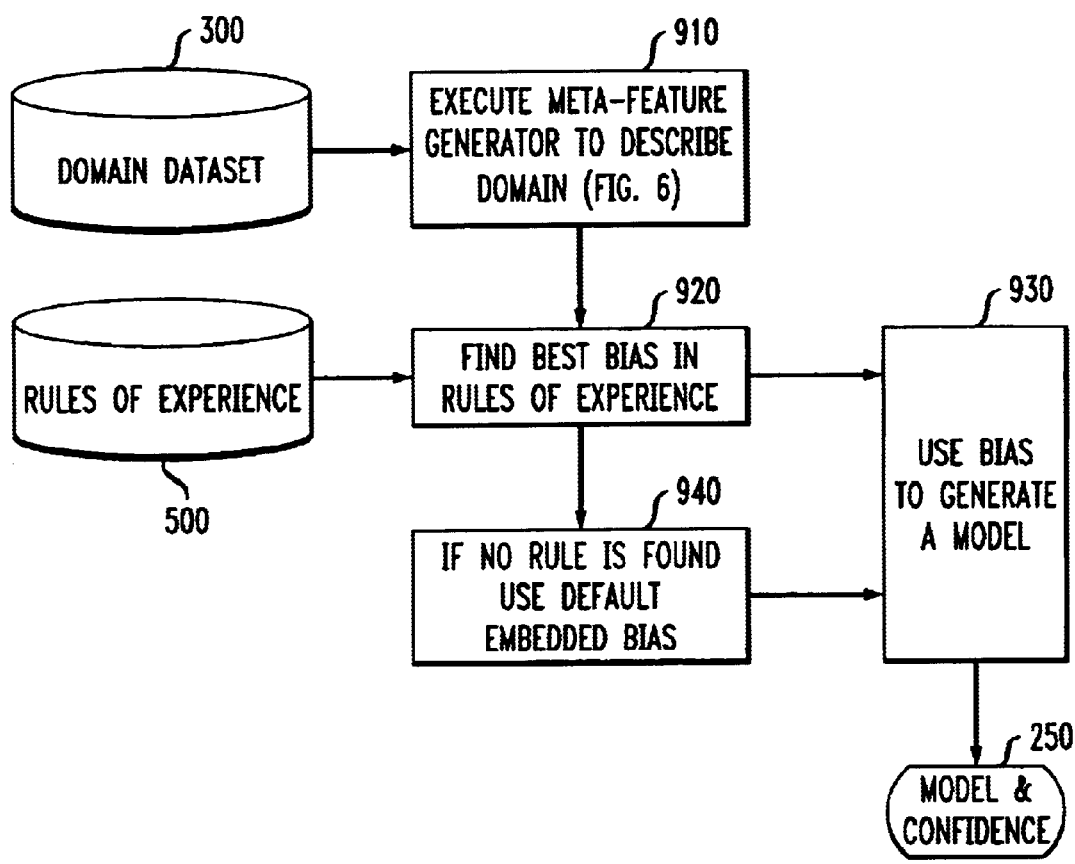
FIG. 9 is a flow chart describing the self-adaptive learning process of FIG. 1 incorporating features of the present invention.

FIG. 9 is a flow chart describing an exemplary self-adaptive learning process 900-N that identifies the best model for a given domain dataset 300, based on the current rules of experience table 500. Thus, FIG. 9 illustrates the first function of the self-adaptive learning process 900-N, wherein a model is generated for the classification of data. As shown in FIG. 9, the self-adaptive learning process 900 initially executes the meta-feature generation process 600, discussed above in conjunction with FIG. 6, during step 910 to provide a meta-feature description of the current domain. During step 920, the self-adaptive learning process 900 sequentially compares the meta-feature description of the current domain to each of the rules in the rules of experience table 500 until a rule is satisfied. In this manner, the first satisfied rule provides the best bias to utilize for the current domain.

If a rule is satisfied, then the corresponding bias is applied to generate the model 250 during step 930. If, however, no rule in the rules of experience table 500 is satisfied for the current domain, then a default bias is retrieved during step 940 and the default bias is applied to generate the model 250 during step 930. In addition to identifying the best bias to use in a generated model, the self-adaptive learning algorithm also provides a confidence level, in accordance with well-known techniques. Thereafter, program control terminates.

Dynamic Bias in the Meta-learning Algorithm

Figure 10:
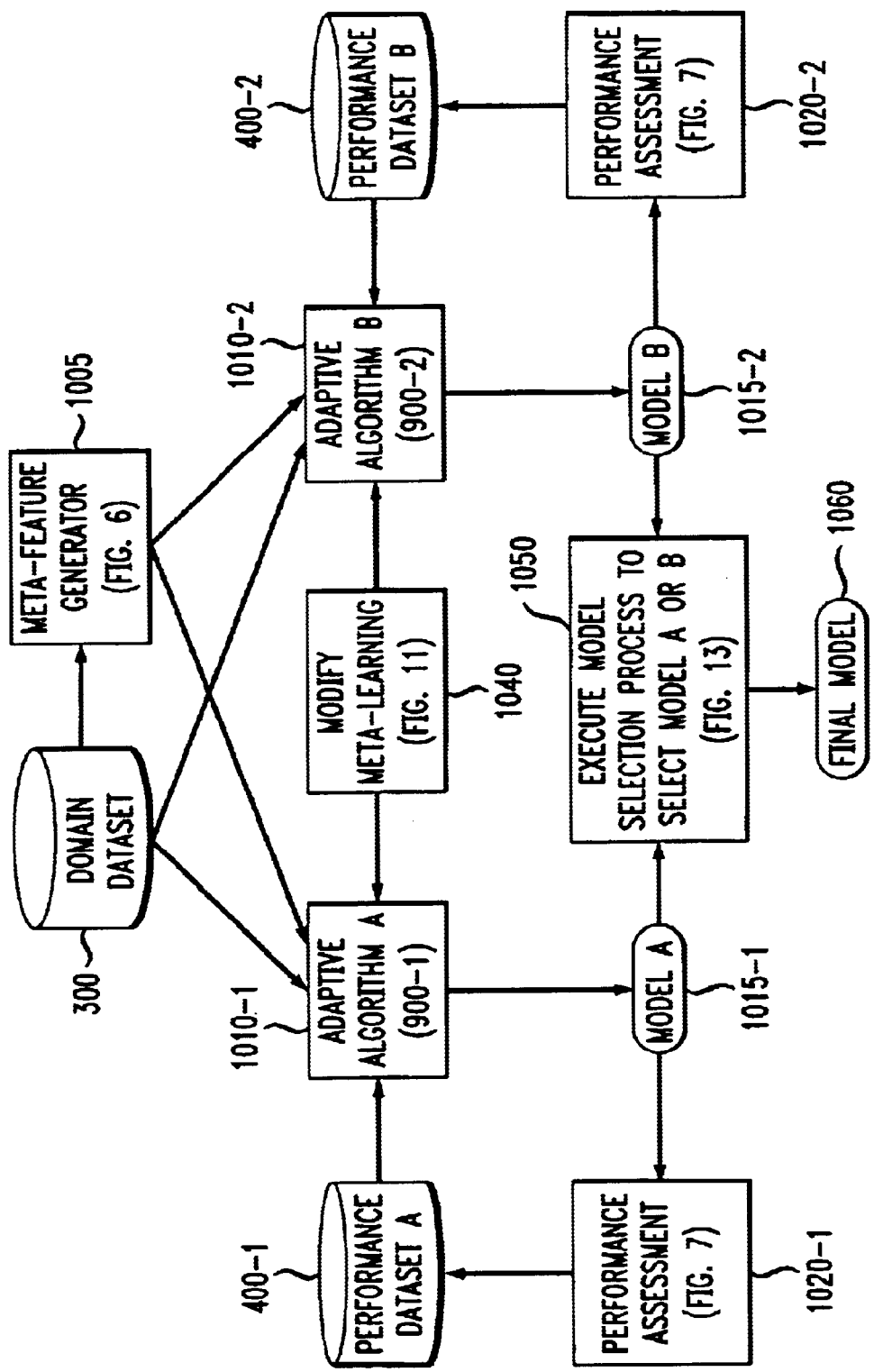
FIG. 10 is a conceptual block diagram illustrating portions of the present invention from a process point of view.

FIG. 10 is a conceptual block diagram illustrating portions of the present invention from a process point of view. As shown in FIG. 10, a dynamic bias may be employed in the meta-learning algorithm, without introducing an infinite chain, by utilizing two self-adaptive learning algorithms 900-1 and 900-2. Each of the two self-adaptive learning algorithms 900-1 and 900-2 has two functions: (i) generating models used for data classification (as discussed more fully above in conjunction with FIG. 9); and (ii) serving as an adaptive meta-learner for the other adaptive learning algorithm (as discussed further below in conjunction with FIG. 11).

As shown in FIG. 10, the process begins during step 1005 by characterizing an input domain dataset 300 according to a set of meta-features, using the meta-feature generation process 600 (FIG. 6). The input domain dataset 300 and corresponding meta-feature description thereof are then applied to each self-adaptive learning algorithm 900-1 and 900-2 during steps 1010-1, 1010-2, respectively. The self-adaptive learning algorithms 900-1 and 900-2 select a corresponding model during step 1015, in the manner described above in conjunction with FIG. 9. The performance of the generated model is assessed during steps 1020-1, 1020-2, in the manner described above in conjunction with FIG. 7, and the assessment is recorded in the corresponding performance dataset 400-N.

As shown in FIG. 10, the execution of each self-adaptive learning algorithm 900-1 and 900-2 during steps 1010-1, 1010-2, respectively, is influenced by a modify meta-learning stage 1040, discussed further below in conjunction with FIG. 11. In addition, the two models 1015-1, 1015-2 that are generated by self-adaptive learning algorithms 900-1 and 900-2 during steps 1010-1, 1010-2, respectively, are evaluated by a model selection process 1300, discussed below in conjunction with FIG. 13, during step 1050 to select a final model 1060.

Figure 11:
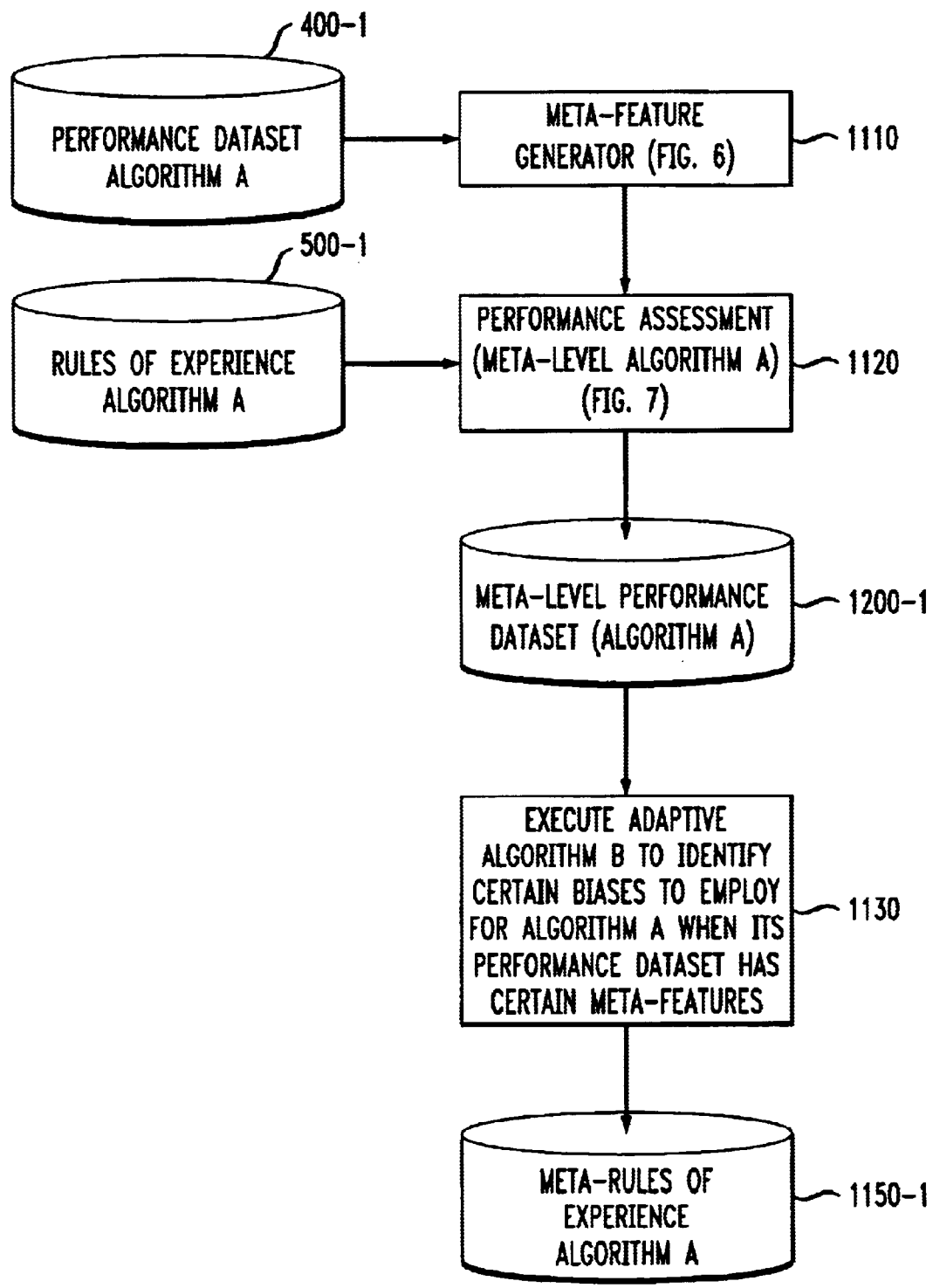
FIG. 11 is a flow chart describing an exemplary modify meta-learning process of FIG. 10.

FIG. 11 is a flow chart describing an exemplary modify meta-learning process 1100. The exemplary modify meta-learning process 1100 shown in FIG. 11 illustrates the operation for the first self-adaptive learning algorithm 900-1, but the operation is equivalent for the second self-adaptive learning algorithm 900-2, as would be apparent to a person of ordinary skill in the art.

As shown in FIG. 11, the modify meta-learning process 1100 initially applies the performance dataset 400-1 for the first self-adaptive learning algorithm 900-1 to the meta-feature generation process 600 (FIG. 6) to characterize the performance dataset as a set of meta-features. It is noted that the performance dataset 400-1 evaluates the quality of various models that were generated by the first self-adaptive learning algorithm 900-1. Thereafter, the performance of the first self-adaptive learning algorithm 900-1 is assessed during step 1120 by the performance assessment process 700, using the dynamic rules of experience 500-1 for the first self-adaptive learning algorithm 900-1. The performance assessment process 700 will produce a meta-level performance dataset 1200-1, discussed further below in conjunction with FIG. 12, for the first self-adaptive learning algorithm 900-1 that evaluates the quality of various rules of experience that were employed by the first self-adaptive learning algorithm 900-1 under various conditions. Thus, when the performance assessment process 700 (FIG. 7) is applied to the rules of experience 500-1 on the meta-learning level, the entries created in meta-level performance dataset 1200-1 include the meta-feature description of the performance dataset 400-1 (generated during step 1110), a description of the rule of experience that was applied to the performance dataset 400-1, and the corresponding quality evaluation that was determined by the assessment process 700.

Thereafter, the second self-adaptive learning algorithm 900-2 is executed during step 1130 to evaluate the meta-level performance dataset 1200-1 and identify certain biases to employ for the first self-adaptive learning algorithm 900-1 when the performance dataset 1200-1 has certain meta-features. The second self-adaptive learning algorithm 900-2 will generate the meta-rules of experience 1150-1 for the first self-adaptive learning algorithm 900-1 that identify a particular bias to employ when the performance dataset exhibits certain characteristics.

Figures 12, 13:
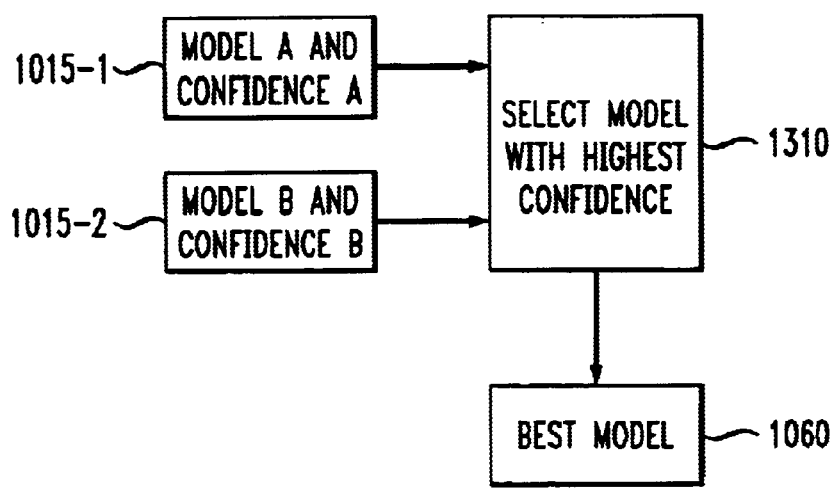
FIG. 12 illustrates an exemplary table from the meta-level performance dataset of FIG. 11.
FIG. 13 is a flow chart describing an exemplary model selection process of FIG. 10.

FIG. 12 illustrates an exemplary table from the meta-level performance dataset 1200-N. As previously indicated, the meta-level performance dataset 1200 indicates the performance of the associated adaptive learning algorithm 900 when applying each rule of experience. The meta-level performance dataset 1200 maintains a plurality of records, such as records 1205 through 1215, each associated with a different rule of experience. For each rule of experience identified in field 1255, the meta-level performance dataset 1200 provides a meta-feature description of the performance dataset (as produced by the meta-feature generation process 600) on which the rule of experience was utilized in field 1250, as well as the performance assessment in field 1260. Each performance dataset can be identified in field 1250, for example, using a vector of meta-features. As previously indicated, for each self-adaptive learning algorithm 900-1 and 900-2, there will be a corresponding meta-level performance dataset 1200-N.

As previously indicated, the two models 1015-1, 1015-2 that are generated by the self-adaptive learning algorithms 900-1 and 900-2 are evaluated by the model selection process 1300, shown in FIG. 13, to select a final model 1060.

As shown in FIG. 13, the model selection process 1300 evaluates the two models 1015-1, 1015-2 generated by the self-adaptive learning algorithms 900-1 and 900-2, and the corresponding confidence scores, during step 1310 and selects the model with the highest confidence score as the best model 1060.

It is to be understood that the embodiments and variations shown and described herein are merely illustrative of the principles of this invention and that various modifications may be implemented by those skilled in the art without departing from the scope and spirit of the invention.

What is claimed is:

1. A method for classifying data, comprising the steps of:
   classifying objects in a domain dataset using at least two adaptive learning algorithms, each of said adaptive learning algorithms employing a data classification model, each of said data classification models having a bias;
   modifying at least one of said biases based on a performance evaluation of said classifying step;
   evaluating a performance of one of said adaptive learning algorithms with another of said adaptive learning algorithms; and
   selecting one of said data classification models to classify said data.

2. The method of claim 1, wherein said modifying step further comprises the step of processing performance values for each combination of said domain datasets and said bias to generate one or more rules, each of said rules specifying one or more characteristics of said domain datasets and a corresponding bias that should be utilized in one of said data classification models.

3. The method of claim 2, wherein said evaluating step further comprises the step of evaluating the performance of one or more of said rules to generate a meta performance dataset.

4. The method of claim 3, wherein said meta performance dataset is processed to identify one or more meta-rules, each of said meta-rules specifying one or more characteristics of said performance dataset and a corresponding one of said rules hat should be utilized with said performance dataset.

5. The method of claim 1, wherein said steps of classifying and modifying are performed for a plurality of said domain datasets and wherein said method further comprising the steps of recording a performance value for each combination of said domain datasets and said bias.

6. The method of claim 2, further comprising the step of selecting a data classification model for classifying a domain dataset by comparing characteristics of said domain dataset to said rules.

7. The method of claim 1, wherein said domain dataset is represented using a set of meta-features.

8. The method of claim 7, wherein said meta-features includes a concept variation meta-feature.

9. The method of claim 7, wherein said meta-features includes an average weighted distance meta-feature that measures the density of the distribution of said at least one domain dataset.

10. A method for classifying data, comprising:
    applying at least two adaptive learning algorithms to a domain dataset, each of said two adaptive learning algorithms selecting a data classification model, each of said data classification models having a bias;
    classifying objects in said domain dataset using a selected data classification models;
    modifying at least one of said biases based on a performance evaluation of said classifying step; and
    evaluating a performance of one of said adaptive learning algorithms with another of said adaptive learning algorithms and updating criteria used in said performance evaluation.

11. The method of claim 10, wherein said modifying step further comprises the step of processing performance values for each combination of said domain datasets and said bias to generate one or more rules, each of said rules specifying one or more characteristics of said domain datasets and a corresponding bias that should be utilized in one of said data classification models.

12. The method of claim 11, wherein said evaluating step further comprises the step of evaluating the performance of one or more of said rules to generate a meta performance dataset.

13. The method of claim 12, wherein said meta performance dataset is processed to identify one or more meta-rules, each of said meta-rules specifying one or more characteristics of said performance dataset and a corresponding one of said rules that should be utilized with said performance dataset.

14. A method for classifying data, comprising the steps of:
    applying at least two adaptive learning algorithms to a domain dataset, each of said two adaptive learning algorithms employing a data classification model, each of said data classification models having a bias;
    employing one of said adaptive learning algorithms to select a data classification model to classify objects in said domain dataset; and
    employing one of said adaptive learning algorithms to evaluate a performance of another of said adaptive learning algorithms.

15. The method of claim 14, wherein said selection of said data classification model analyzes one or more rules, each of said rules specifying one or more characteristics of said domain datasets and a corresponding bias that should be utilized in one of said data classification models.

16. The method of claim 15, further comprise the step of evaluating the performance of one or more of said rules to generate a meta performance dataset.

17. The method of claim 16, wherein said meta performance dataset is processed to identify one or more meta-rules, each of said meta-rules specifying one or more characteristics of said performance dataset and a corresponding one of said rules that should be utilized with said performance dataset.

18. A system for classifying data, comprising:
    a memory that stores computer-readable code; and
    a processor operatively coupled to said memory, said processor configured to implement said computer-readable code, said computer-readable code configured to:
    classify objects in a domain dataset using at least two adaptive learning algorithms, each of said adaptive learning algorithms employing a data classification model, each of said data classification models having a bias;
    modify at least one of said biases based on a performance evaluation of said classifying step;

evaluate a performance of one of said adaptive learning algorithms with another of said adaptive learning algorithms; and select one of said data classification models to classify said data.

19. The system of claim 18, wherein said processor is further configured to modify at least one of said biases by processing performance values for each combination of said domain datasets and said bias to generate one or more rules, each of said rules specifying one or more characteristics of said domain datasets and a corresponding bias that should be utilized in one of said data classification models.

20. The system of claim 19, wherein said processor is further configured to evaluate a performance by evaluating the performance of one or more of said rules to generate a meta performance dataset.

21. The system of claim 20, wherein said meta performance dataset is processed to identify one or more meta-rules, each of said meta-rules specifying one or more characteristics of said performance dataset and a corresponding one of said rules that should be utilized with said performance dataset.

22. A system for classifying data, comprising:

a memory that stores computer-readable code; and a processor operatively coupled to said memory, said processor configured to implement said computer-readable code, said computer-readable code configured to:

apply at least two adaptive learning algorithms to a domain dataset, each of said two adaptive learning algorithms selecting a data classification model, each of said data classification models having a bias;

classify objects in said domain dataset using a selected data classification models;

modify at least one of said biases based on a performance evaluation of said classifying step; and evaluate a performance of one of said adaptive learning algorithms with another of said adaptive learning algorithms and updating criteria used in said performance evaluation.

23. An article of manufacture for classifying data, comprising:

a computer readable medium having computer readable code means embodied thereon, said computer readable program code means comprising:

a step to classify objects in a domain dataset using at least two adaptive learning algorithms, each of said adaptive learning algorithms employing a data classification model, each of said data classification models having a bias;

a step to modify at least one of said biases based on a performance evaluation of said classifying step;

a step to evaluate a performance of one of said adaptive learning algorithms with another of said adaptive learning algorithms; and a step to select one of said data classification models to classify said data.

24. An article of manufacture for classifying data, comprising:

a computer readable medium having computer readable code means embodied thereon, said computer readable program code means comprising:

a step to apply at least two adaptive learning algorithms to a domain dataset, each of said two adaptive learning algorithms selecting a data classification model, each of said data classification models having a bias;

a step to classify objects in said domain dataset using a selected data classification models;

a step to modify at least one of said biases based on a performance evaluation of said classifying step; and a step to evaluate a performance of one of said adaptive learning algorithms with another of said adaptive learning algorithms and updating criteria used in said performance evaluation.

* * * * *

UNITED STATES PATENT AND TRADEMARK OFFICE
CERTIFICATE OF CORRECTION

PATENT NO. : 6,728,689 B1
DATED : April 27, 2004
INVENTOR(S) : Drissi et al.

It is certified that error appears in the above-identified patent and that said Letters Patent is hereby corrected as shown below:

Title page,
Item [56], References Cited, OTHER PUBLICATIONS, delete "Breiman., "Bagging Predictors," Machine Learning, 23, 123-140 (1996)"; and delete "Perez et al., "Learning Despite Concept Variation by Finding Structure in Attribute-Based Data," International Conference on Machine Learning (1996)".

Column 11,
Line 43, before "should" and after "rules" replace "hat" with -- that --.

Signed and Sealed this

Twentieth Day of September, 2005

JON W. DUDAS
*Director of the United States Patent and Trademark Office*